United States Patent [19]
Latham

[11] Patent Number: 5,253,108
[45] Date of Patent: Oct. 12, 1993

[54] HELMET-MOUNTED DISPLAY
[75] Inventor: Philip Latham, London, England
[73] Assignee: British Aerospace Public Limited Company, London, England
[21] Appl. No.: 754,496
[22] Filed: Sep. 3, 1991
[30] Foreign Application Priority Data
Sep. 8, 1990 [GB] United Kingdom ............... 9019698
[51] Int. Cl.⁵ ............................................. G02B 27/24
[52] U.S. Cl. ..................................... 359/482; 359/471
[58] Field of Search ............... 359/471, 472, 462, 464, 359/480, 482

[56] References Cited
FOREIGN PATENT DOCUMENTS
0226231 6/1987 European Pat. Off. .
3828262 12/1989 Fed. Rep. of Germany .
3904362 12/1989 Fed. Rep. of Germany .
2354013 6/1976 France .
2205417 12/1988 United Kingdom .

Primary Examiner—Scott J. Sugarman
Attorney, Agent, or Firm—Cushman, Darby & Cushman

[57] ABSTRACT

An optical arrangement for a helmet-mounted display for providing binocular presentation to a pilot from a single display source or for superimposing the images from two display sources on his helmet-mounted display. In one embodiment a single display source 1 provides an image which is alternately directed between left and right eyes of the pilot by means of one scanning mirror 4 and two fixed mirrors 5a and 5b. An iris 3 opens and closes in synchronism with the movement of the scanning mirror 4 in order to prevent image distortion. Because only one display source is required, the weight of the arrangement is kept to a minimum. In another embodiment, using similar core elements the images from two display sources are alternately projected on to the pilot's visor by means of similar fixed mirrors 5a and 5b and a scanning mirror 4, but using two iris' 3+ and 3" synchronised to the mirror movements one in each optical path from display source 1' (or 1") to fixed mirror 5a (or 5b).

6 Claims, 2 Drawing Sheets

HELMET-MOUNTED DISPLAY

BACKGROUND OF THE INVENTION

1. Field of the Invention

This invention relates to helmet mounted displays. In this specification the term "helmet" means any article worn by an observer on his/her head and includes protective helmets such as those worn by aircraft pilots or vehicle drivers and simple instrument supporting head bands such as those worn by surgeons and other medical workers. The term "helmet mounted display" shall mean apparatus attached to, located on, or forming part of such a helmet and for presenting images or information to the wearer of the helmet.

2. Description of the Related Art

For combat aircraft use, flight testing and medical examination have confirmed that binocular display to the pilot both aids performance and also reduces brain fatigue.

At present, binocular presentation is provided by either having:

(i) two sources of display or
(ii) one source with optical train containing a split prism.

The adoption of solution (i) doubles the number of devices on the helmet providing the display and hence increases the helmet mass.

The adoption of solution (ii) halves the level of brightness of the display as inherently the split prism has a 50% transmission characteristic.

Consequently both the existing techniques have operational disadvantages. Firstly, excess mass and the adverse physiological effect under g forces; and secondly, low brightness and hence loss of display under high ambient light conditions.

There is alternatively often a requirement to provide the pilot with information f rom two similar or dissimilar data sources simultaneously. Such sources may be for example cathode ray tube, dot matrix, or conventional optical displays. Currently the pilot may view one source only at a time.

SUMMARY OF THE INVENTION

Hence there is a requirement for a helmet mounted display able to display the information from a single source binocularly or alternatively to display the superimposed information from two sources. It is an object of our invention to provide a range of helmet mounted displays which may meet either of these requirements.

It is to be understood that although we emphasize the application of our invention to protective helmets for pilots, other users of helmet mounted displays, for example surgeons who need both hands free to perform invasive surgery and use such displays linked to body probing sensors, have similar requirements and would benefit equally from the use of our invention.

According to the present invention an optical arrangement for a helmet mounted display includes a scanning reflecting element for alternately presenting a reflecting surface thereof to a reflecting surface of a first fixed reflecting element and then to a reflecting surface of a second fixed reflecting element and iris means adapted to open and close in synchronism with the scanning action of said scanning reflecting element for only providing a light path from a source of light to a display via said scanning reflecting element and a respective one of said first or second fixed reflecting elements whenever their reflecting surfaces are substantially presented to each other.

We use the term "presented" herein in relation to reflecting surfaces to mean that they are so aligned that light incident on and reflected by one reflecting surface will be incident on and reflected by the other.

According to the present invention in one particular aspect thereof an optical arrangement for a helmet mounted display comprises a display source for producing an image;

a scanning reflecting element for alternately directing said image along one of two light paths and thereby generating two secondary images;

an iris located between the display source and the scanning reflecting element and adapted to open and close in synchronism with the scanning actions of said scanning reflecting element; and two fixed reflecting elements, each for reflecting one of said secondary images into a corresponding one of an observer's eyes.

In the above aspect of the invention we provide a binocular display to the helmet wearer from a single source. However the concept is applicable to the requirement mentioned earlier for a display combining information from two sources. According to the present invention in this further aspect thereof an optical arrangement for a helmet mounted display comprises a first light source and a second light source for producing a first image and a second image respectively;

a scanning reflecting element for alternately directing the first image and the second image towards a common display area;

a first fixed reflecting element for reflecting the first image towards the scanning reflecting element;

a second fixed reflecting element for reflecting the second image towards the scanning reflecting element;

a first iris adapted to open and close in synchronism with the scanning action of said scanning reflecting element for only providing a light path between the first light source and the common display area via the first fixed reflecting element and the scanning reflecting element whenever the reflecting surfaces of the latter two are substantially presented to each other; and a second iris adapted to open and close in synchronism with the scanning action of said scanning reflecting element for only providing a light path between the second light source and the common display area via the second fixed reflecting element and the scanning reflecting element whenever the reflecting surfaces of the latter two are substantially presented to each other.

BRIEF DESCRIPTION OF THE DRAWINGS

Two embodiments of the invention will now be described, by way of example only, with reference to the drawings of which.

DETAILED DESCRIPTION OF THE PRESENTLY PREFERRED EXEMPLARY EMBODIMENTS

Figure 4:
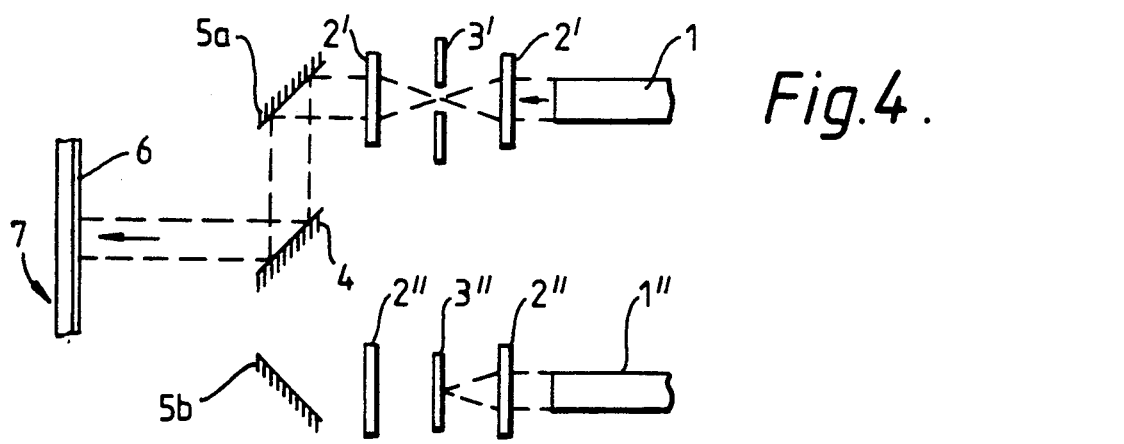
FIGS. 4, 5 and 6 are schematic representations of an optical arrangement in accordance with a second embodiment of the invention each figure illustrating three distinct modes of operation.
Figure 5:
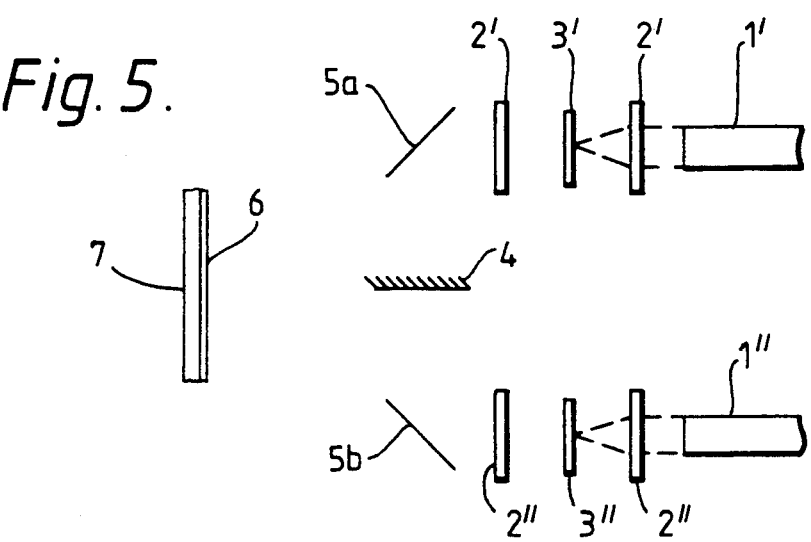
Figure 6:
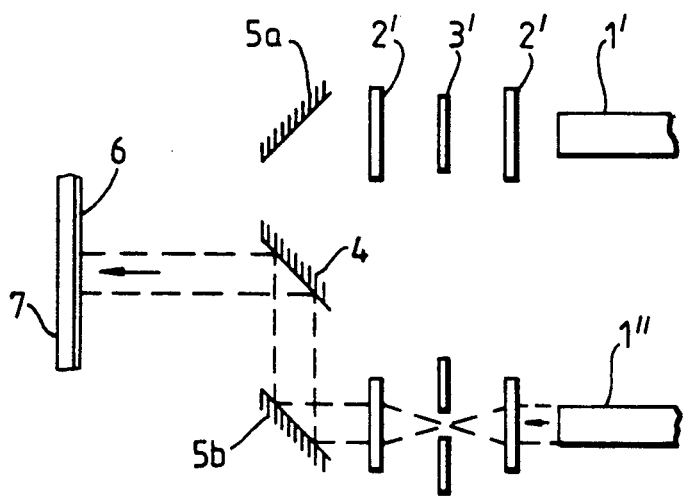

In all the Figures common elements have been given identical reference numerals as an aid to understanding the invention. The first embodiment, shown in FIGS. 1, 2 and 3 is referred to hereafter as the single source embodiment, and the second embodiment, shown in FIGS. 4, 5 and 6 is referred to hereafter as the two source embodiment.

In the single source embodiment the display arrangement comprises a display source 1, a converging lens 2, an iris 3, a scanning mirror 4, fixed mirrors 5a, 5b, a helmet visor 6 and a visor reflective coating 7.

Figure 1:
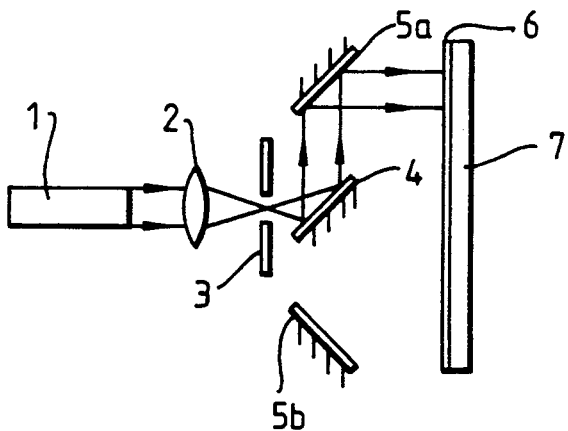
FIGS. 1, 2 and 3 are schematic representations of an optical arrangement in accordance with a first embodiment of the invention each figure illustrating three distinct modes of operation.
Figure 2:
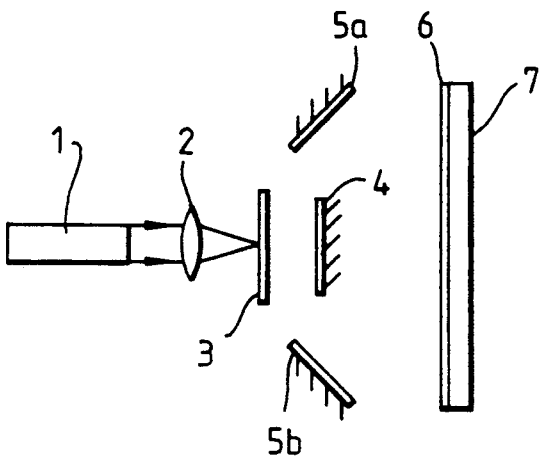
Figure 3:
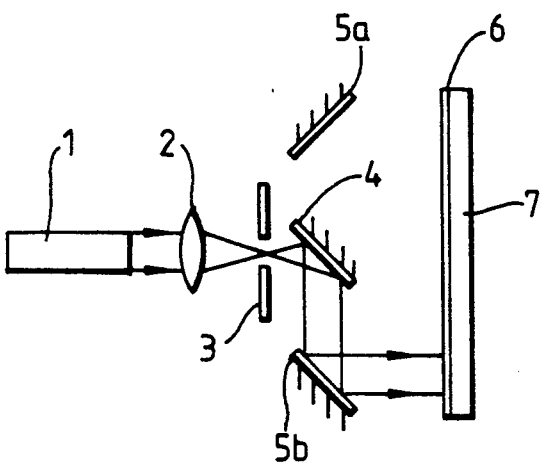

In use, the scanning mirror 4 is driven by a low cost miniature torque motor (not shown), powered from a transformed 1200V power supply (not shown) used to power the pilot's helmet display, so that the mirror 4 alternates between position (a) of FIG. 1 and position (b) of FIG. 3 at 50 Hz (or greater). The design of the mirror and it's alternating drive system (not shown) may be similar to that of similar scanning mirror systems used in known FLIR systems.

The iris 3 is synchronized to open when the scanning mirror 4 is temporarily stationary as it alternates between positions (a) and (b).

FIG. 2 shows an intermediate state with the iris 3 closed.

An image produced by the source 1 is focused by the lens 2 so that only a minimum iris aperture movement is necessary. When the iris 3 is open the image is reflected by the scanning mirror 4 at position (a) or (b) on to mirrors 5a or 5b respectively and hence alternately onto the visor 6. This gives an update rate to each eye of 25 Hz (or greater). As the minimum acceptable update rate to the eye for an image to appear constant is 25 Hz, the displayed image is flicker-free. Due to the use of the scanning mirror 4 the image viewed through the visor 6 is bright and the closure of the iris 3 prevents image distortion as the scanning mirror 4 moves between positions (a) and (b).

Apart from use as a Helmet Mounted Display for aircraft the arrangement could be used in conjunction with a camera for visual monitoring of tests where direct optical vision is precluded due to potential damage to the eye, eg. laser testing.

In the two source embodiment shown in FIGS. 4, 5 and 6 the display arrangement comprises two display sources 1' and 1" each of which transmits an image via respective lenses and irises 2', 3' and 2", 3", to respective fixed mirrors 5a and 5b towards a centrally located scanning mirror 4. As before the remainder of the display comprises a helmet visor 6 and a visor sensitive coating 7.

The sources 1' and 1" may be cathode ray tubes, dot matrix displays or conventional optical displays or any combination of these.

In use, the scanning mirror 4 alternates between position (a) of FIG. 4 and position (b) of FIG. 6 at 50 Hz or greater.

The irises 3' and 3" are synchronised to open when the scanning mirror 4 is temporarily stationary and presenting its reflective surface to the respective fixed mirror 5a or 5b.

FIG. 5 shows an intermediate state of the scanning mirror 4 with both irises 3' and 3" closed.

An image produced by the source 1' is focused by the lens 2' so that only a minimum iris aperture movement is necessary. When the iris 3' is open the image is recollimated by the second lens 2' and reflected via the fixed mirror 5a, the temporarily stationary scanning mirror 4 and onto the visor 6. The image produced by source 1" is similarly produced on the visor 6 by means of lenses 2", iris 3" stationary mirror 5b and scanning mirror 4 when in the position shown in FIG. 6. To the observer's eyes located behind the visor 6 the images from the two sources 1' and 1" appear superimposed since each is updated at a rate of 25 Hz or greater so that the combined image is flicker-free.

Using the optical arrangement in accordance with FIGS. 4, 5 and 6 cathode ray tube data could for example be superimposed onto a night vision enhancement picture without recourse to complex electronic mixing.

It will be apparent from a consideration of the arrangement shown in FIGS. 1, 2 and 3 and the arrangement shown in FIG. 4, 5 and 6, that the concept of using a scanning mirror in association with two fixed mirrors together with a synchronised iris and a helmet mounted visor display is common to both. In the first arrangement the image from a single source is split to give binocular vision whereas in the second arrangement two images are combined to give a superimposed display. In both arrangements the core elements remain the same.

Many modifications and improvements to the embodiments described above will now suggest themselves to those skilled in the art. For example the scanning mirror 4 need not alternate between two stationary reflective positions but could be made to rotate continuously at a constant angular speed of 50 Hz or greater. The scanning mirror may be provided with a plurality of reflective surfaces mounted for example on a rotating polygon so that, provided the irises were switched at appropriate times, the scanning rates could be increased and/or the angular speed be reduced to maintain or to improve the quality of the binocular display or the superimposed display as appropriate.

Also, the iris may be a mechanically operated shutter mechanically linked to the scanning mirror drive mechanism so as to operate synchronously therewith or it may be a liquid crystal or Kerr Cell shutter operated electronically at appropriate times.

I claim:

1. An optical arrangement for a helmet mounted display including:
   a first fixed reflecting element having a reflecting surface;
   a second fixed reflecting element having a reflecting surface;
   a scanning reflecting element for alternately presenting a reflecting surface thereof to said reflecting surface of said first fixed reflecting element and then to said reflecting surface of said second fixed reflecting element; and
   iris means for opening and closing in synchronism with the scanning action of said scanning reflecting element so that a light path is provided only from a source of light to a display via said scanning reflecting element and a respective one of said first or second fixed reflecting elements whenever their reflecting surfaces are substantially presented to each other.

2. An optical arrangement for a helmet mounted display comprising:

a display source for producing an image;

a scanning reflecting element for alternately directing said image along one of two light paths and thereby generating two secondary images, one secondary image along each of said two light paths;

an iris located between the display source and the scanning reflecting element and adapted to open and close in synchronism with the movement of the scanning, reflecting element; and two fixed reflecting elements, each for reflecting one of said secondary images into a corresponding one of an observer's eyes.

3. An optical arrangement for a helmet mounted display comprising a first light source and a second light source for producing a first image and a second image respectively;

a scanning reflecting element for alternately directing the first image and the second image towards a common display area;

a first fixed reflecting element for reflecting the first image towards the scanning reflecting element;

a second fixed reflecting element for reflecting the second image towards the scanning reflecting element;

a first iris adapted to open and close in synchronism with the scanning action of said scanning reflecting element for only providing a light path between the first light source and the common display area via the first fixed reflecting element and the scanning reflecting element whenever the reflecting surfaces of the latter two are substantially presented to each other; and a second iris adapted to open and close in synchronism with the scanning action of said scanning reflecting element for only providing a light path between the second light source and the common display area via the second fixed reflecting element and the scanning reflecting element whenever the reflecting surfaces of the latter two are substantially presented to each other.

4. An optical arrangement for a helmet mounted display as claimed in claim 1 or claim 2 or claim 3 and wherein the scanning reflecting element is adapted to alternate between two positions at each of which its direction of movement is reversed and at each of which its reflecting surface is presented to a respective one of the reflecting surfaces of said first or second fixed reflecting elements.

5. An optical arrangement for a helmet mounted display as claimed in claim 1 or claim 2 or claim 3 and wherein the scanning reelecting element is adapted to rotate at a constant angular speed and thereby to pass through positions at each of which its reflecting surface is presented to a respective one of the reflecting surfaces of said first or second fixed reflecting elements.

6. An optical arrangement for a helmet mounted display as claimed in claim 5 and wherein the scanning reflecting element is a polygon having a plurality of reflecting surfaces.

* * * * *